US005143652A

United States Patent [19]

Slinn

[11] Patent Number: 5,143,652

[45] Date of Patent: Sep. 1, 1992

[54] REDUCED FLAMMABILITY MIXTURE BASED ON ISOPROPANOL

[75] Inventor: David S. L. Slinn, Bristol, United Kingdom

[73] Assignee: Rhone-Poulenc Chimie, Courbevoie, France

[21] Appl. No.: 690,827

[22] Filed: Apr. 26, 1991

[30] Foreign Application Priority Data

Apr. 27, 1990 [GB] United Kingdom ................ 9009504

[51] Int. Cl.[5] ...................... C09K 21/00; C03C 23/00

[52] U.S. Cl. .................................. 252/602; 252/162; 252/171; 252/364; 134/2

[58] Field of Search .................. 252/602, 162, 171, 2, 252/364; 134/2

[56] References Cited

U.S. PATENT DOCUMENTS 3,804,769 4/1974 Lomas ................................ 252/171
4,169,807 10/1979 Zuber ................................ 252/171
4,322,309 3/1982 Rinehart ............................ 252/171
4,378,968 4/1983 Peigner et al. ......................... 8/142

*Primary Examiner*—Richard D. Lovering
*Assistant Examiner*—N. Bhat
*Attorney, Agent, or Firm*—Finnegan, Henderson, Farabow, Garrett and Dunner

[57] ABSTRACT

Ternary mixtures of isopropanol, water and a perfluorocarbon boiling at 30° to 70° C., especially perfluoro-n-hexane, have reduced flammability. They can be used for cleaning purposes.

3 Claims, 1 Drawing Sheet

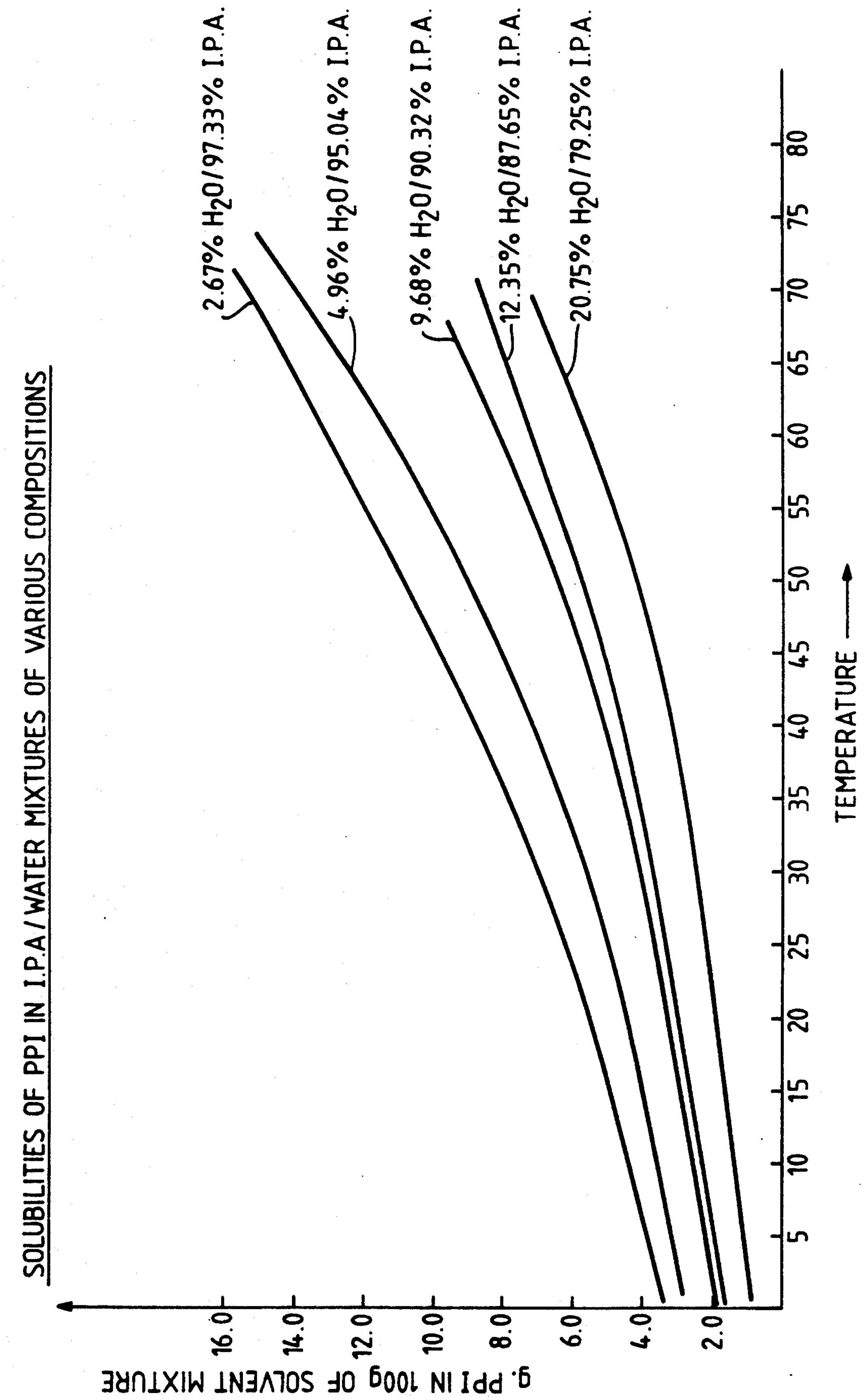
SOLUBILITIES OF PPI IN I.P.A/WATER MIXTURES OF VARIOUS COMPOSITIONS
2.67% $H_2O$/97.33% I.P.A.
4.96% $H_2O$/95.04% I.P.A.
9.68% $H_2O$/90.32% I.P.A.
12.35% $H_2O$/87.65% I.P.A.
20.75% $H_2O$/79.25% I.P.A.
g. PPI IN 100g OF SOLVENT MIXTURE
16.0
14.0
12.0
10.0
8.0
6.0
4.0
2.0
TEMPERATURE
5
10
15
20
25
30
35
40
45
50
55
60
65
70
75
80

REDUCED FLAMMABILITY MIXTURE BASED ON ISOPROPANOL

This invention relates to solvent mixtures of reduced flammability.

Isopropanol is a particularly useful solvent for cleaning assemblies containing a wide variety of polymers. It combines the ability to dissolve both polar and non-polar contaminants with excellent compatibility. (Another significant advantage is that it is not normally subject to Customs and Excise Regulations that apply to ethyl alcohol). Isopropanol is therefore particularly useful within the precision engineering and electronics industries where many different polymeric materials can exist in a single assembly. Official recognition of its usefulness in the electronics industry is exemplified in Military Standards such as the US Mil. Std. 28809 and UK DTD 599 for the removal of flux residues. An additional advantage of isopropanol is that it does not present environmental problems, such as ozone depletion. Also, it can be readily disposed of.

A major disadvantage of isopropanol is its flammability and it is an object of the present invention to provide a means whereby its flammability is considerably reduced without adversely affecting its desirable properties.

Isopropanol (and other flammable solvents) can be mixed with halocarbons (CFC's) to reduce its flammability. However, the scope for using halocarbons has been reduced because of the purported adverse effect of chlorine and bromine on the environment, and particularly on the ozone layer. Hence, commonly used solvents such as 1,1,1-trichloro-1,2,2-trifluoroethane (CFC 113) and 1,1,1-trichloroethane are coming under increasing restrictions. CFC 113 belongs to the chlorofluorocarbon group of compounds, which are likely to be phased out within the next decade. Hydrochlorofluorocarbons (HCFC's) have been suggested as solvent replacements because they decompose in the troposphere much quicker than CFC's, thereby significantly reducing their impact on the earth's ozone layer. However, these compounds are less chemically stable than the CFC's and are also less compatible with polymeric materials.

The halocarbons called perfluorocarbons, in which the hydrogen in hydrocarbons such as n-hexane is completely replaced by fluorine, are inert, have very low toxicities, show exceptional compatibility characteristics, and are ozone friendly. However, their flame inhibiting effect is marginal when they are mixed up to their solubility limits with alcohols.

We have now unexpectedly found that addition of water to a mixture of perfluoro-n-hexane, or another perfluorocarbon of similar volatility, and isopropanol unexpectedly has a marked effect in reducing the flammability of the mixture. This effect is surprising because addition of water does not have the same marked effect with ethyl alcohol.

While perfluor-n-hexane (b.p. 57° C.) is the preferred perfluorocarbon other perfluorocarbons of similar volatility, e.g. having a boiling point in the range 30° to 70° C., can be used, for example perfluoromethylcyclopentane (b.p. 48° C.) or perfluorodimethylcyclobutane.

The perfluoro-n-hexane/isopropanol/water mixture should be substantially saturated with the perfluorocarbon.

In our British patent application 89/15464 published under No. 2220951,we have described methods and apparatus in which a heated perfluorocarbon liquid layer under a flammable liquid layer is used to provide the combined benefits of flame inhibition, vigorous agitation and heat transfer to the flammable liquid. During heating, the perfluorocarbon boils, causing vapour bubbles to rise through the higher boiling flammable liquid to form a non-flammable, perfluorocarbon-rich vapour blanket above the flammable liquid, thereby preventing ignition. However, when the equipment is idle, i.e. when the lower perfluorocarbon liquid layer ceases to be heated, a situation can exist where the flammable liquid surface can again be ignited. Use of a solvent mixture in accordance with the present invention provides a means to reduce significantly the flammability of the solvent, when the apparatus is idle, i.e. when the protective, perfluorocarbon-rich vapour layer is absent.

BRIEF DESCRIPTION OF THE DRAWING

The FIGURE shows the solubility of perfluoro-n-hexane in aqueous isopropanol at varying compositions and at various temperatures.

The present invention accordingly provides a ternary mixture comprising isopropanol and water saturated with a perfluorocarbon having a boiling point in the range of 30° to 70° C. Preferably the water content is between 1 and 30% by weight, based on the combined weight of the isopropanol and the water. The preferred perfluoro-n-hexane may contain minor proportions of structural isomers and other perfluorocarbons (e.g. perfluoromethylcyclohexane) of similar boiling point. Preferably the perfluorocarbon has a boiling point in the range of 40° to 60° C.

Especially preferred mixtures in accordance with the invention comprise, at 20° C., 78 to 92% of isopropanol, 2 to 20% by weight of water, and 2 to 6% by weight of perfluoro-n-hexane, the percentages being based on the total weight of the mixture. These mixtures are saturated with the perfluoro-n-hexane. It is necessary to specify the temperature a the solubility of the perfluoro-n-hexane in aqueous isopropanol rises with increasing temperature.

The superiority of mixtures in accordance with the invention is illustrated in Table 1, and the solubility of perfluoro-n-hexane in aqueous isopropanol at varying compositions and at various temperatures are given in the accompanying drawing. The flashpoints of the mixtures specified in Table 1 were measured using the Abel closed-cup method according to BS 2000 Standard, part 170, 1982. In an attempt to simulate the conditions existing in the apparatus described in our aforesaid British patent application 89/15464, the test was conducted with a layer of perfluorocarbon liquid under the alcohol. The results are given in Table 1 and particular note should be taken of mixtures 3 and 4 which are in accordance with the present invention, especially mixture 3.

TABLE 1

| Liquid mixture tested | Composition Wt. % | | | | | Flash-point (°C.) |
|---|---|---|---|---|---|---|
| | Water | IPA | ETA | PFNH | PFMCP | |
| 1 | | 100.0 | | | | 13.6 |
| 2 | 12.5 | 87.5 | | | | 16.9 |
| 3 | 12.5 | 84.5 | | 3.0 | | 30.5 |
| 4 | 12.5 | 82.0 | | | 5.5 | 22.1 |
| 5 | | 93.2 | | 6.8 | | 17.1 |

TABLE 1-continued

| Liquid mixture tested | Composition Wt. % Water | IPA | ETA | PFNH | PFMCP | Flash-point (°C.) |
|---|---|---|---|---|---|---|
| 6 | | 87.7 | | | 12.3 | 15.5 |
| 7 | | | 100.0 | | | 12.8 |
| 8 | | 4.4 | 95.6 | | | 15.5 |
| 9 | | 4.2 | 91.1 | 4.7 | | 17.8 |
| 10 | | | 94.9 | 5.1 | | 19.6 |

IPA = Isopropyl alcohol
ETA = Ethyl alcohol
PFNH = Perfluorohexane (B.p. ca. 57° C.) also known as PP1, Manufactured by Rhone-Poulenc Chemicals, Ltd.
PFMCP = Perfluoromethylcyclopentane (B.p. ca. 48° C.)

Consideration of these results led to the conclusion that the Abel closed-cup method did not stir the liquids as vigorously as under the conditions in the apparatus described in our British patent application No. 89/15464. This prevented full saturation of the water-alcohol mixture with the perfluorocarbon. The Abel closed-cup procedure was therefore modified by vigorously shaking the mixture prior to introduction into the closed-cup at the temperature of measurement. This entailed pre-heating of the apparatus to this temperature. The saturation conditions were now identical to those existing in the apparatus of our copending patent application. Using this procedure, no flashpoint was observed up to 48° C. At this temperature, the lower perfluoro-n-hexane layer commenced to boil, thus establishing the protective vapour layer above the alcohol surface.

The invention accordingly includes within its scope two phase mixtures in which one phase is a ternary mixture as defined above having isopropanol as the main ingredient and another is a ternary mixture comprising isopropanol, water and, as the major ingredient, the same perfluorocarbon as in the first phase.

A further test was conducted by filling a small (500 ml) metal container with the saturated mixture 3 of Table 1 at ambient temperature. A lighted taper was then introduced and no ignition occurred across the liquid surface.

These tests indicate that the mixtures of the invention provide significant reduced flammability benefits.

I claim:

1. A mixture comprising two phases:

(1) a ternary phase having isopropanol as the major ingredient and comprising isopropanol and water substantially saturated with a perfluorocarbon having a boiling point in the range of 30° to 60° C. selected from the group consisting of perfluoro-n-hexane and perfluoromethylcyclopentane; and (2) a ternary phase comprising isopropanol, water and the perfluorocarbon of phase (1), said perfluorocarbon being the major ingredient.

2. A mixture according to claim 1 in which the phase (1) comprises 1 to 30% by weight of water, based on the combined weight of the isopropanol and the water in said phase.

3. A mixture according to claim 2 in which the phase (1) comprises, at 20° C., 78 to 92% by weight of isopropanol, 2 to 20% by weight of water, and 2 to 6% by weight of perfluoro-n-hexane, the percentages being based on the total weight of said phase.

* * * * *